United States Patent Office 3,476,683
Patented Nov. 4, 1969

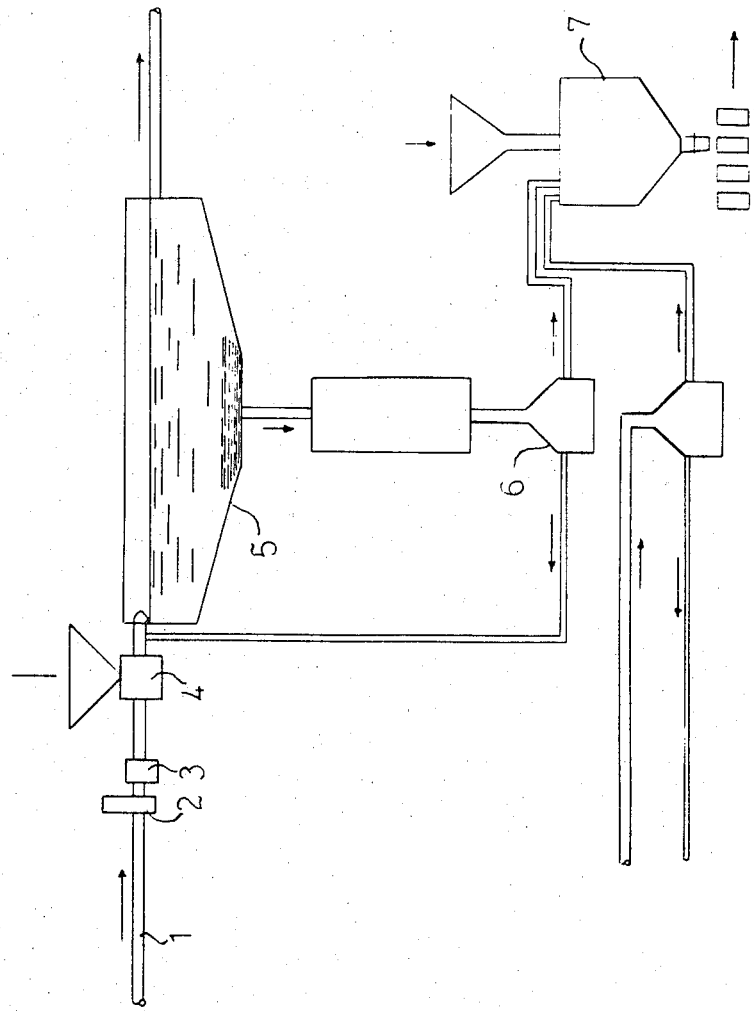

3,476,683
METHODS OF SEPARATING INORGANIC IMPURITIES FROM SEWAGE AND OF MAKING A SOIL IMPROVING COMPOSITION FROM THE IMPURITIES SEPARATED
Johan Ragnar Liljegren, 4 Ulasgatan,
794 00 Orsa, Sweden
Filed May 20, 1968, Ser. No. 730,565
Claims priority, application Sweden, May 23, 1967,
7,168/67; Jan. 11, 1968, 335/68
Int. Cl. C02c 1/18, 1/00
U.S. Cl. 210—8
4 Claims

ABSTRACT OF THE DISCLOSURE

A method of separating inorganic impurities from sewage and of making a soil improving composition from the impurities separated, comprises adding to the sewage, on the basis of the measured quantity of the sewage and the degree of pollution thereof, a precipitating agent in the form of lime, hydrate of lime, slaked lime, leading the water thus admixed with lime into pools in which the heavy precipitates sink to the bottom as sludge and the light-weight precipitates assisted by the gas formation resulting from the reaction in the water rise to the surface, and removing the sludge and floating precipitates from the water and dewatering the sludge and the precipitates. For the preparation of the soil improving composition the dewatered sludge is mixed with sludge obtained from a purification plant operating biologically with active sludge, treated in the same way and preferably dewatered together with the first mentioned sludge, and during mixing a suitable quantity of unslaked lime, calcium oxide, is added to the dewatered sludge mixture to effect both sterilization and drying thereof.

---

This invention relates to a method of separating inorganic impurities from sewage and of making a soil improving composition from these impurities. By this method the inorganic salts are separated with the aid of precipitating agents from the sewage which as a rule has been passed through a biologically operating plant for removing organic impurities therefrom, and are obtained in the form of a sludge.

In connection with the purification of sewage it has not been possible hitherto to provide any economically useful method of separating inorganic impurities, so-called nutritive salts. Attempts have been made at removing int. al. the sodium ammonium salts by precipitation, but these attempts were practically altogether unsuccessful, primarily because of the extremely high costs of the precipitating agents. Another serious problem is that also after dewatering and drying the precipitated sludge contained so much bacteria and similar organisms that it was not suitable as soil improving composition without costly sterilizing procedures. One would thus have to carry the high costs of procuring the precipitating agents and also the further costs of making the precipitated sludge salable, which contains valuable soil improving substances.

The present invention has for its object to provide a method of separating the inorganic impurities from sewage and beisdes of preparing from the separated sludge a sterile soil improving composition. This method comprises the steps of adding to the sewage, on the basis of the measured values of the quantity of sewage and the content of the impurities therein as well as with due consideration of the desired degree of purification, a precipitating agent in the form of lime, hydrate of lime or slaked lime, causing the sewage thus treated to flow into one or more sedimentation and/or flotation pools for the separation of the precipitates before the water is discharged into the receiver, preferably mechanically dewatering the precipitated sludge containing lime and inorganic substance while returning the waste water to said pools, mixing the dewatered sludge with sludge preferably dewatered in a similar manner and deriving from a biologically operating purification plant for sewage and adding an adjusted amount of unslaked lime to said sludge mixture for the purpose of providing, during the heat generation arising at the reaction of the unslaked lime with the remaining water in the sludge mixture, desiccation of the sludge mixture and a sterilization of the mixture of dry substances from the sludge, which mixture is converted at said desiccation into powder form and is useful as a soil improving composition.

The method suggested according to the present invention will be more fully described in the following with reference to the accompanying drawing which diagrammatically illustrates a sewage purification plant adapted to operate in accordance with the method.

The sewage enters the plant through the conduit 1. The illustarted plant as a rule is placed after a purification plant for biological purification, in which the organic constituents of the sewage have been separated. The influent sewage, termed "highly purified," contains as impurities substantially inorganic matter. At the inlet of the plant there are arranged means 2 and 3 for measuring the quantity of the influent sewage and the degree of pollution thereof. Measuring of the degree of pollution can be effected in various ways for example optically, chemically by measuring the oxygen consumption, or electrically. Also disposed adjacent the supply conduit is a device 4 for supplying precipitating agents, preferably lime, and with the aid of this device there is added to the sewage an amount of lime which is automatically adjusted to the influent volume of sewage and its degree of pollution and corresponds to the desired degree of purification. The water admixed with precipitating agent is then caused to flow into one or more sedimentation and/or flotation pools 5 where a vigorous flocculation arises by reaction between the inorganic substances and the precipitating agent. The flocks gradually sink and settle in the form of sludge at the bottom of the pool or rise to the surface thereof. The remaining fully purified water is then discharged into the receiver. The collected sludge is preferably transferred first to a sludge container and thence to a mechanical dewatering plant 6 which separates most of the water from the sludge. The waste water is returned to the separating pool for further treatment. The sludge separated—the sludge of nutritive salts—is to be constituent part of the desired soil improving composition and is therefore mixed in this substantially dry form with a biological sludge obtained from a conventional plant for biological purification of sewage and similarly dried. It should be observed that the mechanical water separating device can be utilized for instance in smaller plants alternatively for sludge of nutritive salts and biological sludge, but that the waste water from the sludge of nutritive salts has to be thoroughly separated from the biologically operating part of the plant in order not to destroy the bacterial flora therein. The two partly dried sludge types are mixed in a mechanical mixing device 7 and unslaked lime is added. At the addition of unslaked lime there arises a strong generation of heat when the lime reacts with the water of the moist sludge and this results in the sludge mixture being dried to powder form and in the sludge powder being sterilized since the temperature amounts during slaking to more than 100° C.

Experiments have shown that the water flowing from the sedimentation pool into the receiver—provided that the biological purification plant ahead of the device for separating nutritive salts functions in a satisfactory manner—contains so small amounts of impurities that it can be ranked equal with such domestic water as is considered less suitable as drinking water.

The soil improving composition obtained in the manner described contains in addition to the organic substances deriving from the biological sludge, lime which is of vital importance to agriculture, and also in various forms minerals and other substances which must indispensably be added to the soil and which had hitherto to be bought in the form of fertilizers.

While the invention has been described here in a preferred embodiment those skilled in the art will readily understand that the invention is not limited to this very embodiment, but can be modified in several ways within the scope of the appended claims.

What I claim and desire to secure by Letters Patent is:

1. A method of separating inorganic impurities from sewage and of making a soil improving composition from these impurities, in which the inorganic salts are separated with the aid of precipitating agents from the sewage which as a rule has been passed through a biologically operating plant for removing organic impurities therefrom, and are obtained in the form of a sludge, comprising the steps of adding to the sewage, on the basis of the measured values of the quantity of sewage and the content of the impurities therein as well as with due consideration of the desired degree of purification, a precipitating agent in the form of lime, hydrate of lime or slaked lime, causing the sewage thus treated to flow into one or more sedimentation and/or flotation pools for the separation of the precipitates before the water is discharged into the receiver, mechanically dewatering the precipitation sludge containing lime and inorganic substances while returning the waste water to said pools, mixing, the dewatered sludge with sludge dewatered in a similar manner and deriving from a biologically operating purification plant for sewage and adding an adjusted amount of unslaked lime to said sludge mixture for the purpose of providing, during the heat generation arising at the reaction of the unslaked lime with the remaining water in the sludge mixture, desiccation of the sludge mixture and a sterilization of the mixture of dry substances from the sludge, which mixture is converted at said desiccation into powder form and is useful as a soil improving composition.

2. A method as claimed in claim 1, in which dewatering of the two sludge types is effected with the aid of a centrifuge, a separator or like apparatus.

3. A method as claimed in claim 1, in which the addition of unslaked lime to the mixture of sludge is so adapted to the moisture content and the sludge mixture that the lime is converted to slaked lime while generating a temperature in excess of 100° C. for a certain period.

4. A method as claimed in claim 2 in which the addition of unslaked lime to the mixture of sludge is so adapted to the moisture content and the sludge mixture that the lime is converted to slaked lime while generating a temperature in excess of 100° C. for a certain period.

References Cited
UNITED STATES PATENTS

| | | | |
|---|---|---|---|
| 113,416 | 4/1871 | Forbes et al. | 71—12 |
| 145,111 | 12/1873 | Latham | 71—12 X |

MICHAEL E. ROGERS, Primary Examiner

U.S. Cl. X.R.
71—12; 210—10, 66